US005493106A

United States Patent [19]

Hunter

[11] Patent Number: 5,493,106

[45] Date of Patent: Feb. 20, 1996

[54] MAIL PROCESSING SYSTEM HAVING A BARCODE USER INTERFACE

[75] Inventor: Kevin D. Hunter, Stratford, Conn.

[73] Assignee: Pitney Bowes Inc., Stamford, Conn.

[21] Appl. No.: 328,196

[22] Filed: Oct. 24, 1994

Related U.S. Application Data

[63] Continuation of Ser. No. 985,061, Dec. 3, 1992, abandoned.

[51] Int. Cl.[6] .......... G06F 17/00

[52] U.S. Cl. .......... 235/375; 364/464.02

[58] Field of Search .......... 235/375, 462, 235/472; 209/547, 613; 364/464.02

[56] References Cited

U.S. PATENT DOCUMENTS

| | | | |
|---|---|---|---|
| 4,055,247 | 10/1977 | Benedick et al. | 206/3 |
| 4,074,114 | 2/1978 | Dobras | 235/463 |
| 4,084,742 | 4/1978 | Silverman | 235/419 |
| 4,329,684 | 5/1982 | Monteath et al. | 235/472 |
| 4,825,058 | 4/1989 | Poland | 235/383 |
| 4,831,610 | 5/1989 | Hoda et al. | 235/472 X |
| 4,841,132 | 1/1989 | Kajitani et al. | 235/472 |
| 4,935,078 | 6/1990 | Bergman et al. | 156/64 |
| 5,003,472 | 3/1991 | Perrill et al. | 364/401 |
| 5,047,614 | 9/1991 | Bianco | 235/385 |
| 5,120,943 | 6/1992 | Benz | 235/472 X |
| 5,250,787 | 10/1993 | Arii et al. | 235/375 |

*Primary Examiner*—John Shepperd
*Assistant Examiner*—Michael G. Lee
*Attorney, Agent, or Firm*—Angelo N. Chaclas; Charles G. Parks, Jr.; Melvin J. Scolnick

[57] ABSTRACT

The improved user interface for a mail processing machine includes a barcode reader and an associated chart having barcodes which are readable by the barcode reader. The barcodes are respectively associated with commands, characters, and accounts such that messages may be constructed by reading selected barcodes from the chart for inputting commands and data into the mail processing machine. The barcode messages are converted into machine commands and data inputs for operation of the machine. Barcode information may also be supplied with batches of mail for ease of entry of pertinent control data for the batch.

6 Claims, 13 Drawing Sheets

MAIL PROCESSING SYSTEM HAVING A BARCODE USER INTERFACE

CROSS REFERENCE TO RELATED APPLICATIONS

This application is a continuation of U.S. application Ser. No. 07/985,061, filed on Dec. 3, 1992, which is now abandoned.

FIELD OF THE INVENTION

The invention relates to interactive user interface systems and more particularly to systems such as mail processing systems having interactive display-keyboards for entering information into the system.

BACKGROUND OF THE INVENTION

In mail processing systems, like many other microcomputer-based systems, there are required an ever increasing number of operator selectable functions as the systems become more sophisticated. The user interface must have the ability to accommodate the increased functionality while remaining user-friendly. The compromises required seldom provide an optimum interface in respect of one or the other of these demands.

U.S. patent application Ser. No. 629,796 filed Dec. 19, 1990 entitled "USER INTERFACE FOR A MAIL PROCESSING SYSTEM", assigned to the assignee of the present application, describes a mailing machine having a display and input comprising six "soft" keys aligned to respective portions of the display along with hard keys typically provided. As part of the data structure stores in the programs, the operator is provided a plurality of screens which include areas which define and enable certain of the hard and soft keys which are made available with each selected screen for operator input. With this display and entry method, an operator can be provided with many menu options along with the concurrent ability to receive instructions and variable data while having the ability to input variable data in the hard key area.

While this system works well and the number of menu choices is greatly reduced by using the known technique, there may be many times with such a structure when it is necessary to shuttle through unwanted screens in order to input a new command or to input necessary changes with respect to a particular account or the like.

Such systems may also include barcode readers. Barcode readers, particularly those utilizing the well-known wands have become a conventional means for inputting account information or product identifications into computer systems. The Post Office uses the barcode reader wand, for example, to input a parcel identification number to track its express mail packages until delivery. When the operator uses the wand however, it is still conventional to input all other information using an associated keypad.

SUMMARY OF THE INVENTION

It is an object of the invention to provide a user friendly interface which uses a barcode reader to provide input data and control information to a system to avoid where possible the necessity of using both the input keys and barcode reader for setting up the system.

It is a further object of the invention to provide a method and apparatus for an interface which allows a bypassing of menu screens to input desired information.

These and other objects are accomplished in a first aspect of the invention by providing in a mail processing machine of the type having an interactive display and input means, an improvement comprising the input means including a barcode reader and an associated barcode chart, the chart including at least one barcode the barcode being a code associated with a predetermined command for controlling the mail processing machine, means in said mail processing machine for converting the barcode read by the barcode reader from the barcode chart into the predetermined command for controlling the machine, whereby the control of the machine may be commanded by a reading of the barcode by the barcode reader.

In a second aspect of the invention there is provided a method for controlling a machine having a barcode reader comprising the steps of providing a chart having at least one barcode thereon, the barcode being associated with a command for controlling the machine, reading the barcode using the barcode reader, converting the read barcode into the command for controlling the machine, and supplying the command to the machine whereby the machine is controllable by the reading of the barcode on the chart.

FIGS. *4a–4c* together comprise a flow chart of the barcode reading logic in accordance with the invention.

Figure 5:
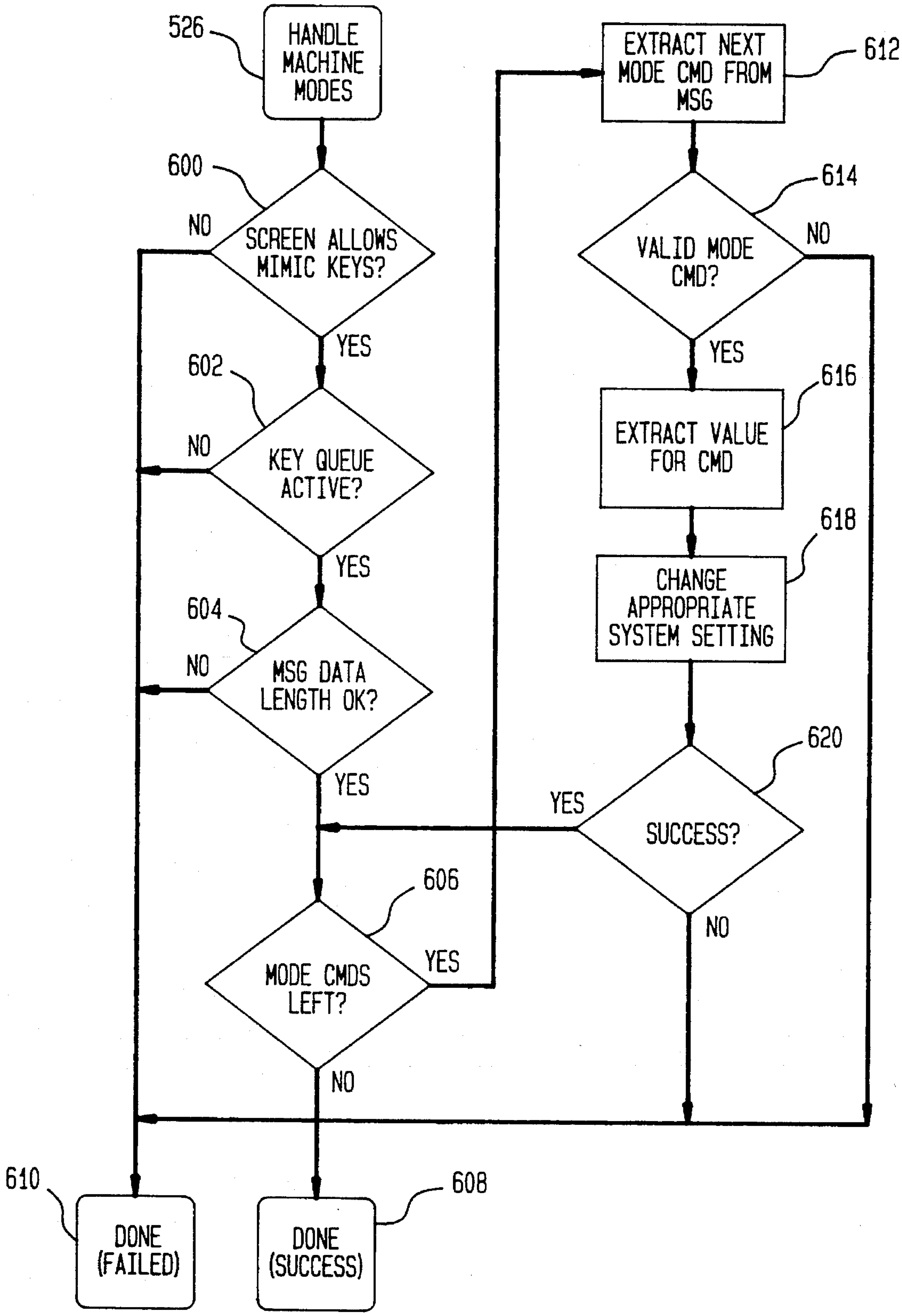

FIG. 5 is a flow chart of the Handle Machine Modes subroutine.

FIGS. *6a–6c* comprise examples of suitable barcode command charts for use with the barcode reader input.

Figure 7:
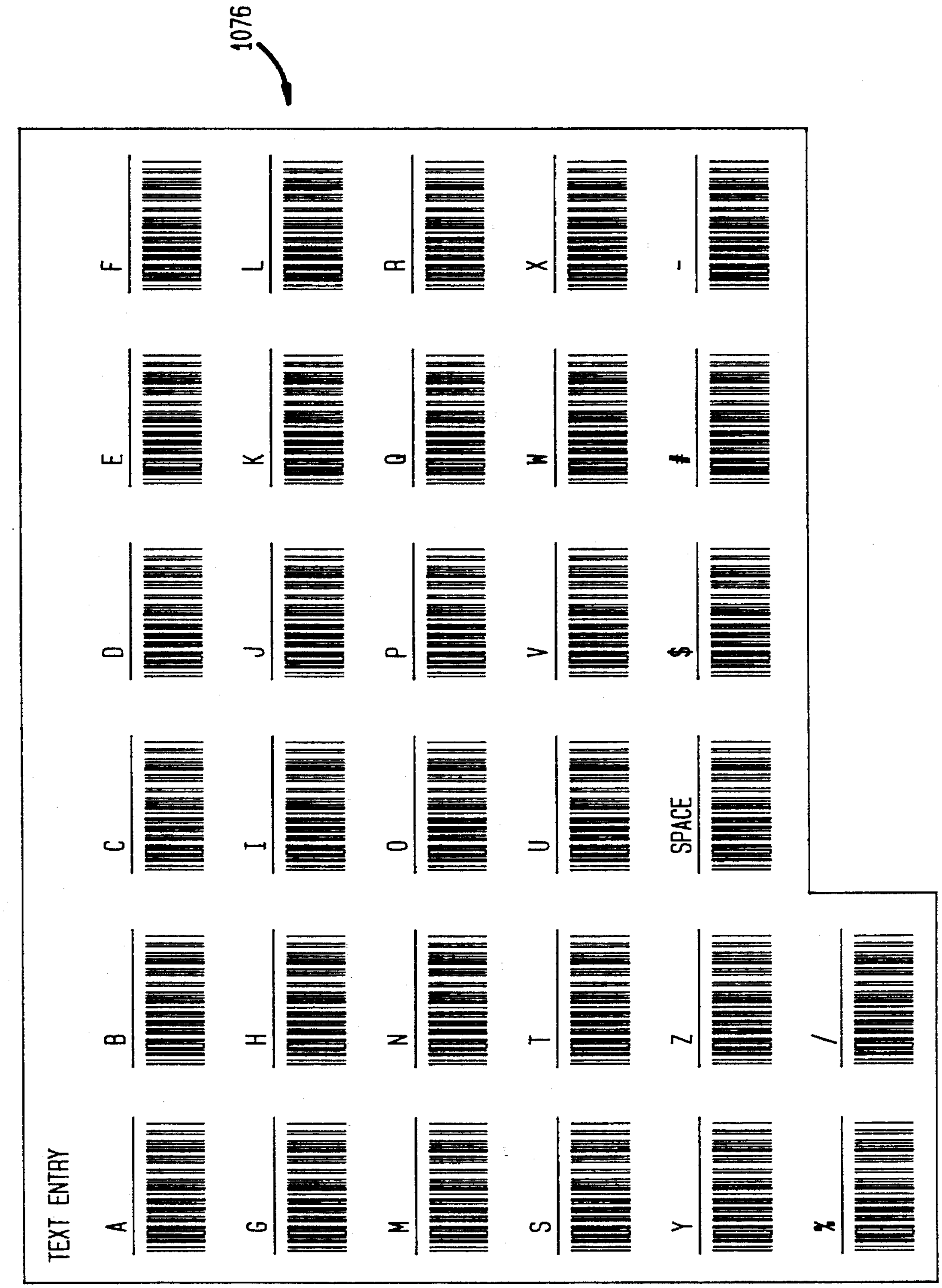

FIG. 7 is an example of a suitable Text entry chart.

Figure 8:
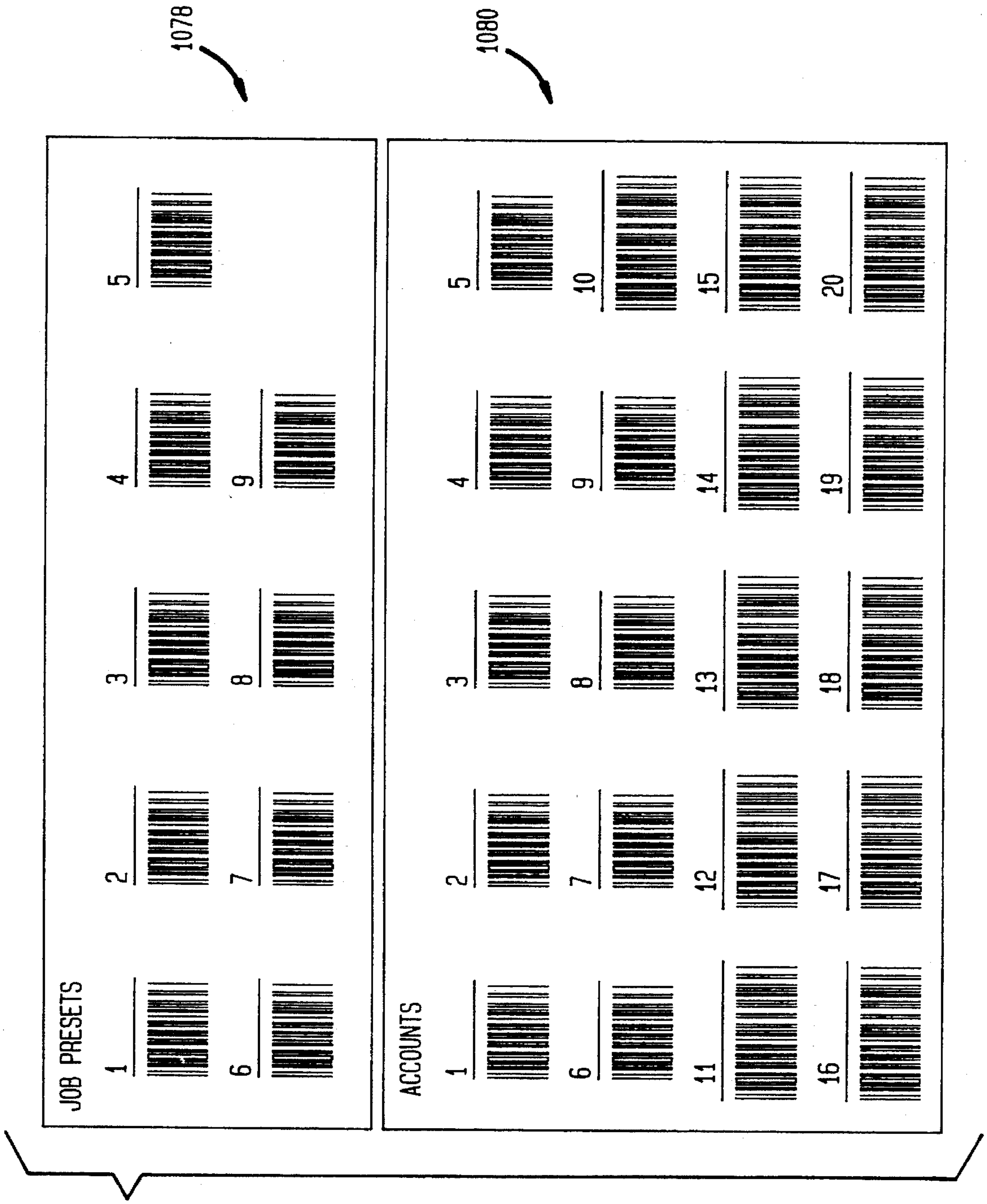

FIG. 8 is an example of a suitable Job Preset and Account Number chart.

Figure 9:
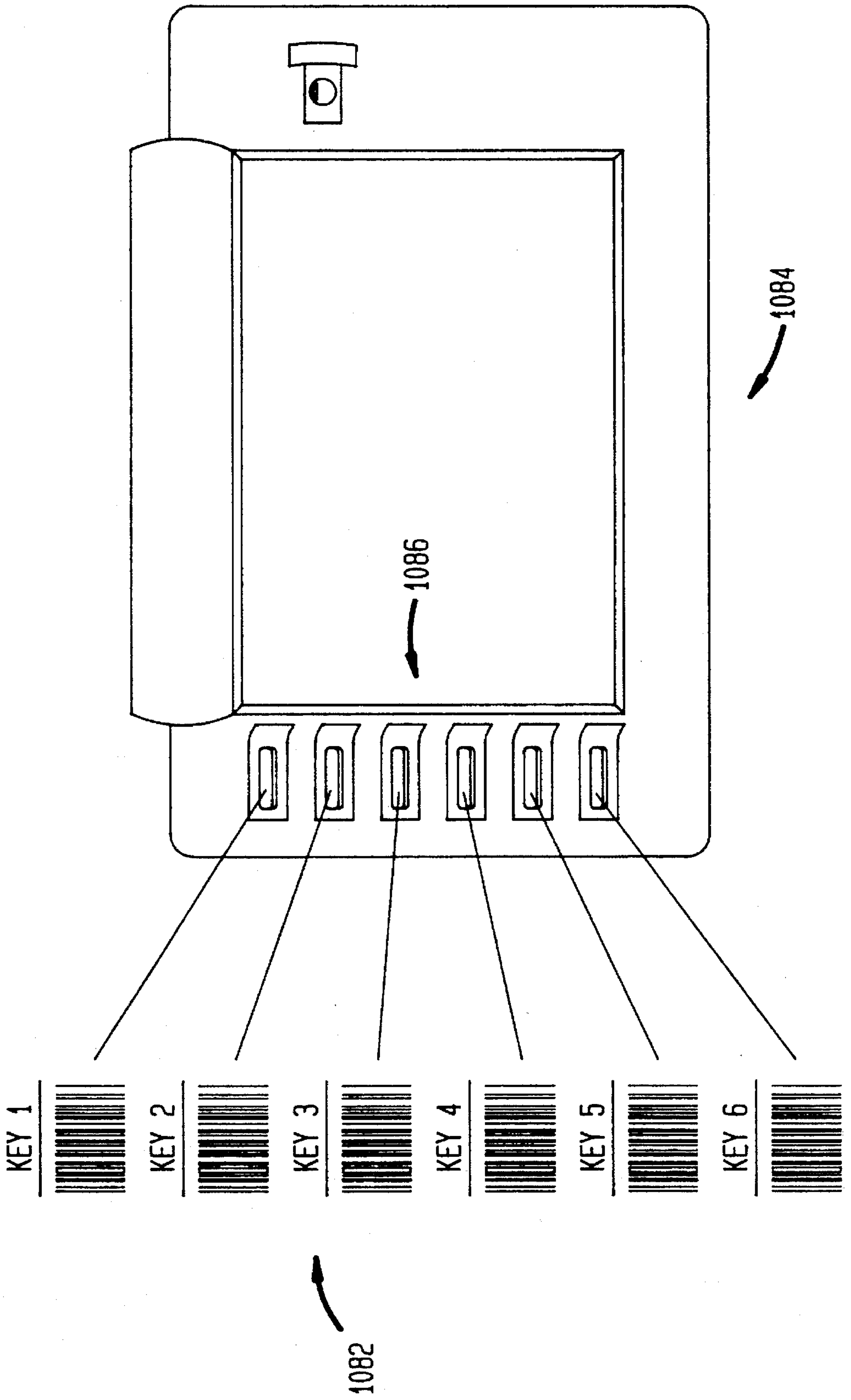

FIG. 9 is an example of a suitable Soft Key barcode chart.

DESCRIPTION OF THE PREFERRED EMBODIMENT

Figure 1:
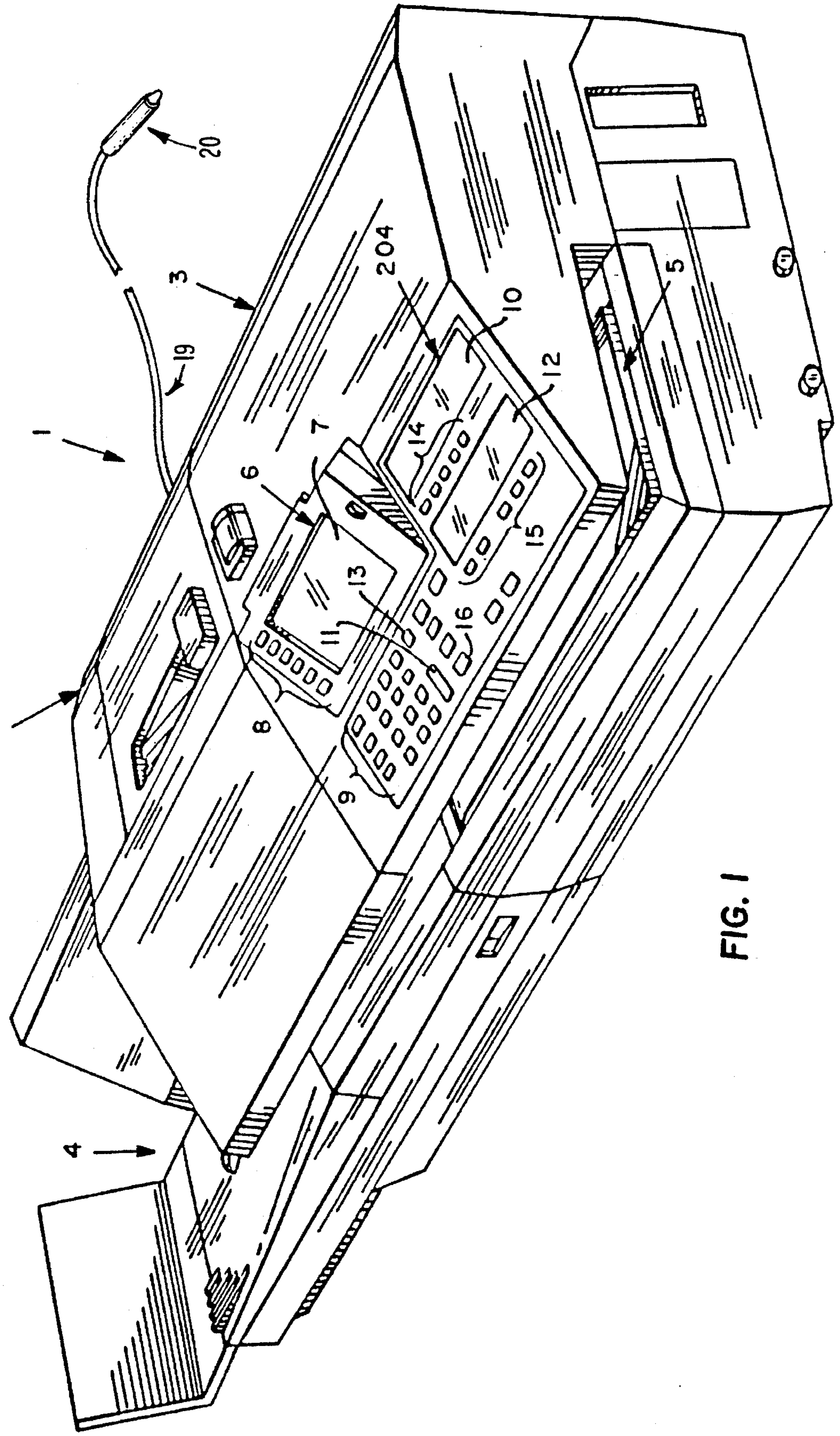
FIG. 1. is a perspective view of a postage meter and a suitable mailing machine in which the invention may reside.

In FIG. 1, there is shown generally at 1 a mailing machine comprising feeder section 2 and an electronic postage meter section at 3. Envelopes are placed on the hopper 4 where they are serially fed to the meter section 3 for imprint of a meter indicia by a printing mechanism not visible in this Figure. In the preferred embodiment, mailing machine includes scale 5 for weighing the envelope and communicating the weight to a microprocessor control so that the proper postage value may be imprinted on the envelope.

The mailing machine 1 has a user interface indicated at 6. This illustrated user interface includes visual display 7 and a plurality of soft keys 8 aligned with respective portions of the display screen as well as the hard keys indicated at 9 of a keyboard or keypad. Typically, as shown there will be "enter" key 11 and "return" key 13. A "start" key is shown at 16. The interface may also include further displays such as those shown at 10 and 12 along with associated keys illustrated at 14 and 15. Also connected to the mailing machine 1 through cable 19 is a conventional barcode reader wand 20 for inputting information to the mailprocessing system.

Figure 2:
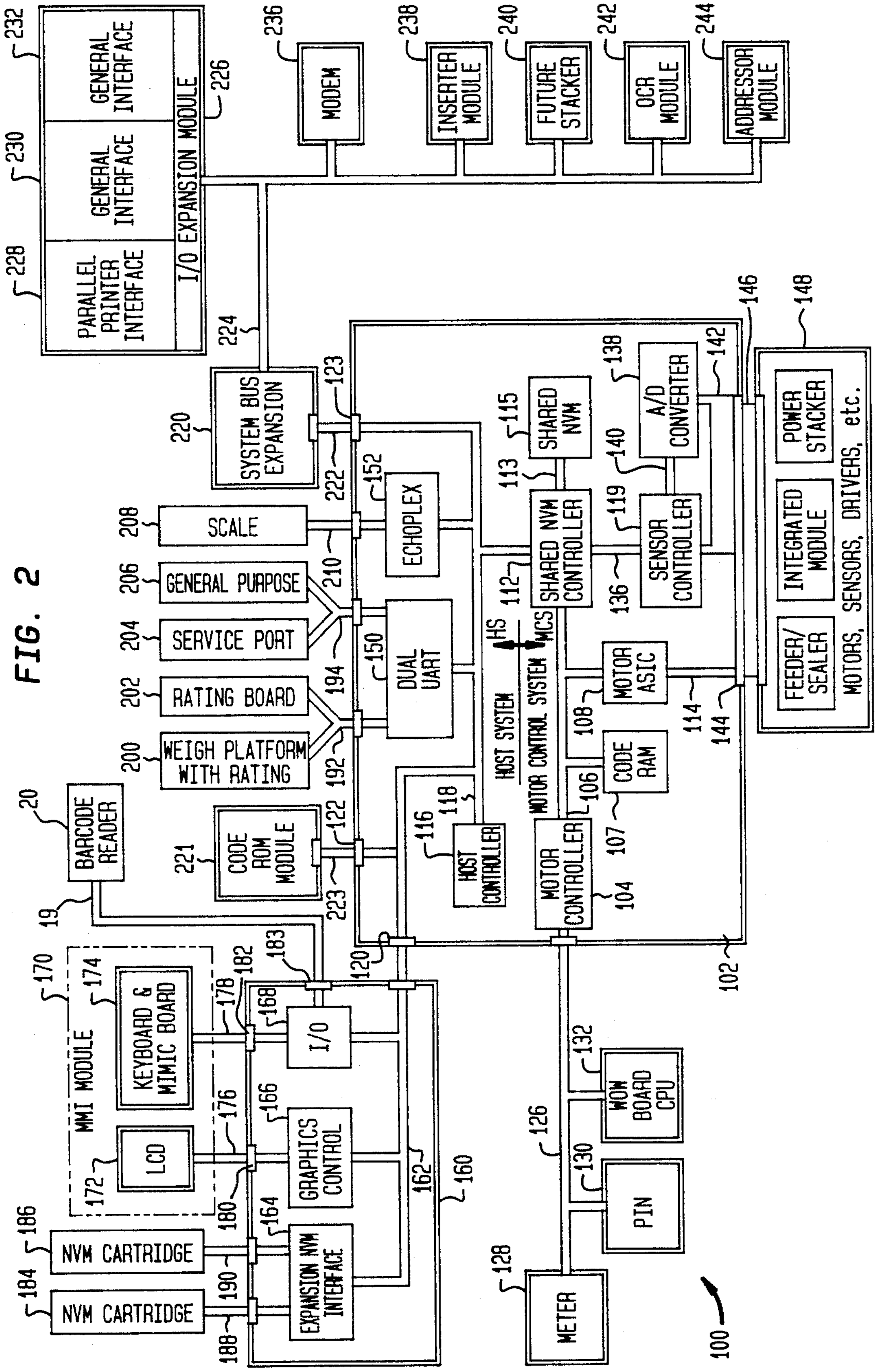
FIG. 2 is a schematic block diagram of a mailing machine microcontroller system in which the interface in accordance with the invention may be incorporated.

FIG. 2 shows a suitable microprocessor control system 100 for the mailing machine comprising, for example, a board 102 having motor controller 104 communicating via bus 106 with ROM 107, motor specific chip 108 and shared non-volatile memory (NVM) controller 112. Host controller 116 communicates via bus 118 with NVM controller 112. The NVM controller 112 communicates via bus 113 with shared NVM 115. The motor controller 104 also communicates via bus 126 with the meter through meter board 128, dater board 130 and scale board 132. Bus 118 also allows communication between the host controller 116 and DUAL UART module 150 and the Echoplex communication module 152.

Microprocessor based sensor controller 119 is in bus communication with NVM controller 112 via bus 136. Sensor bus 142 enables communication from sensor controller 119 and A/D converter to harness coupler 144 from which connection a suitable flex harness 146 is connected to the respective drive motors and sensors of the mailing machine 1 indicated generally at 148. A more detailed description of such a mailing machine postage meter is described in U.S. Pat. No. 4,935,078 entitled High Throughput Mailing Machine Timing.

"Personality" module 160 communicates with host controller bus 118 through bus 162 via coupler 120. This module includes Expansion NVM 164, Graphics controller 166, combination keyboard and MIMIC I/O port 168. The man-machine interface module 170 includes a liquid-crystal display board 172 as well as a keyboard and MIMIC board 174 which are in respective bus 176 and 178 communication with graphics controller 166 and I/O board 168 through respective couplers 180 and 182. I/O board 168 is also shown in communication with the barcode reader wand 20 via cable 19 through connector 183. It will be appreciated that the connection may be to other ports such as general interfaces 230 or 232 if desired. NVM accounting cartridges 184 and 186 are in communication with the NVM expansion I/O board 164 through coupled busses 188 and 190, respectively.

Dual communication module 150 permits coupling of weighing platform with rating 200, rating board 202, a service device 204 or printer 206 or other such general purpose devices. An echoplex output from a scale device 208 may be coupled to Echoplex module 152 via bus 210.

System bus controller 220 communicates via bus 222 with the host controller bus 118 by way of coupler 123. ROM module 221 is coupled by bus 223 with host controller bus 118 through coupler 122. System bus 224 enables communication of the system bus controller 220 with I/O expansion module 226 from which may be coupled, for example, parallel printer interface 228, general purpose interface 230 and custom parallel interface 223. Optional devices such as, for instance, a modem 236, inserter module 238, OCR module 242, addresser module 224, and an additional stacker module may be attached for communication via bus 224.

Figure 3:
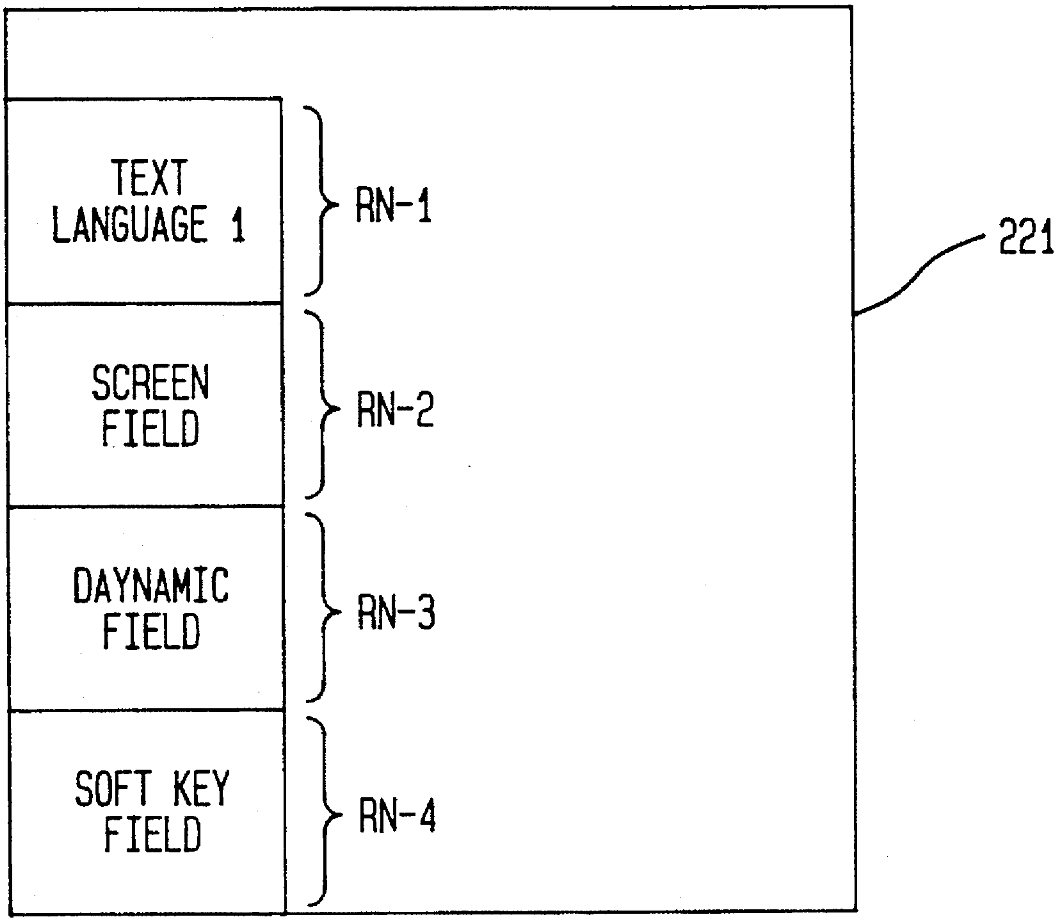
FIG. 3 is an illustration of a particular prior art display for operator interaction with the mailing machine postage meter combination.

Referring to FIG. 3, a suitable display for the user interface as shown in the prior art is indicated at 7. The illustrated display is mapped such that each screen defines data window area DW, a soft key menu field MF, a screen title field TF, and a prompt/error field PF. The soft keys shown at 8*a* through 8*f* are aligned to respective segments of the screen field MF to allow the operator to associate options presented in the segments of the field MF with the respective adjacent soft key. Operator instructions, requests for operator data input and error messages may be presented in the prompt field PF. Data window DW allows other pertinent information to be displayed. A detailed description of the operation and control of the display is available from U.S. application Ser. No. 210,651 filed Mar. 21, 1994, assigned to the assignee of the present invention, which is a Continuation of U.S. application Ser. No. 629,796 filed Dec. 19, 1990 entitled "USER INTERFACE FOR A MAIL PROCESSING SYSTEM", now abandoned.

As detailed therein, the operator may select various options as presented on the screen in the menu field MF and the data window and prompt fields to operate the mailing machine for mail processing, and to access and print various account information and the like. It will be appreciated from the description of the foregoing interface that the operator in some instances will be required to shuttle through several menu screens on various occasions in order to bring up the fields necessary to input desired information or control commands. This can be time-consuming and frustrating, particularly when the same information is required over and over for each new batch of mail.

It has been found that the barcode reader wand may be utilized to input control and other data in addition to account information and that by so doing, much of the frustration and loss of time of moving through the various screens may be eliminated. The associated charts also allow the use of preset system set-up configurations which may be read directly from the chart. It will also be appreciated that in accordance with the invention, the barcode charts also are setup to enable the input of alphanumeric data simply by wiping the respective barcode associated with each number or letter. The operator is thus allowed to input all necessary information and control commands using only the wand and is not under most conditions required to alternate between the keyboard and the wand as has previously been required.

Figure 4A:
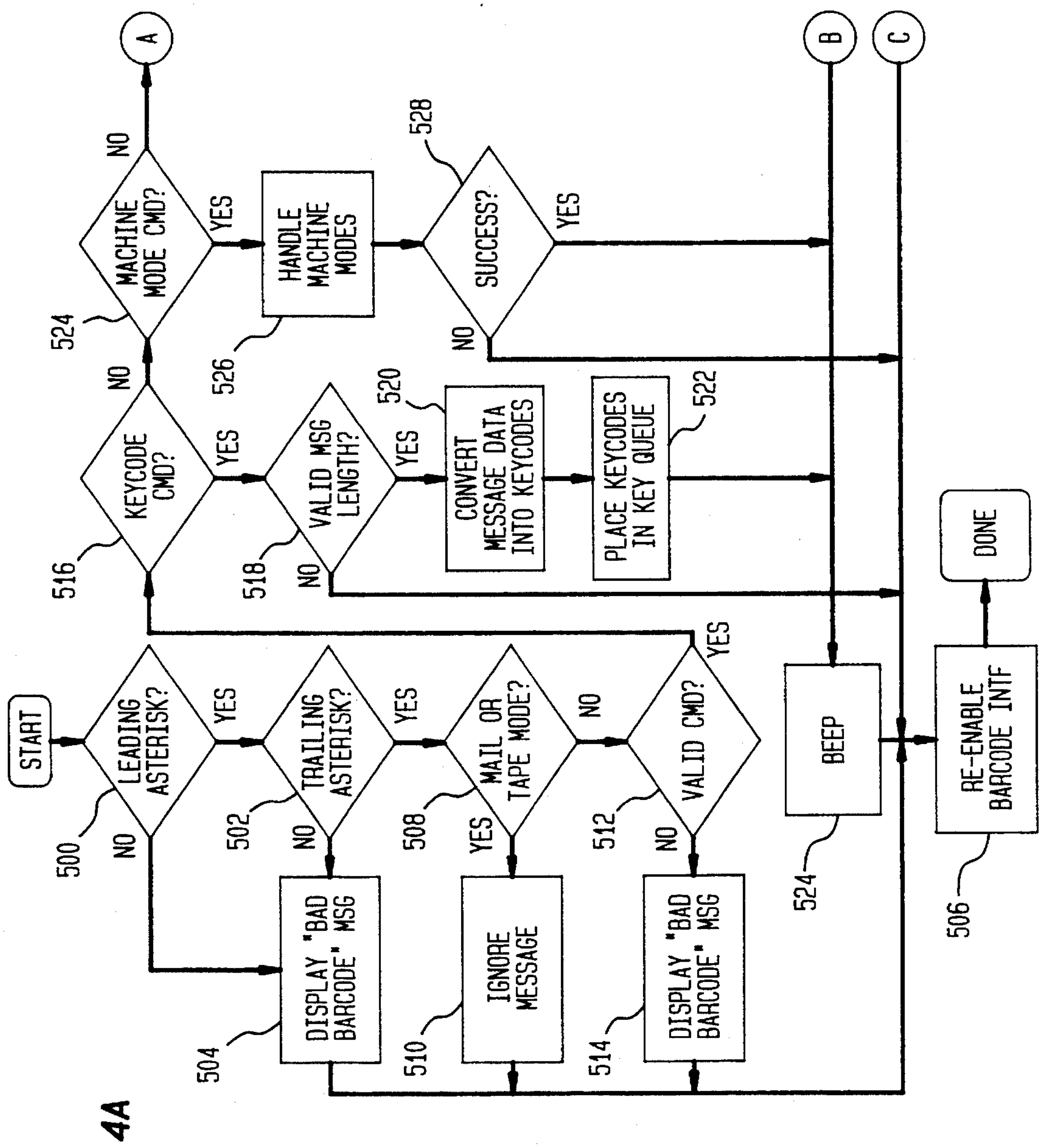
Figure 4B:
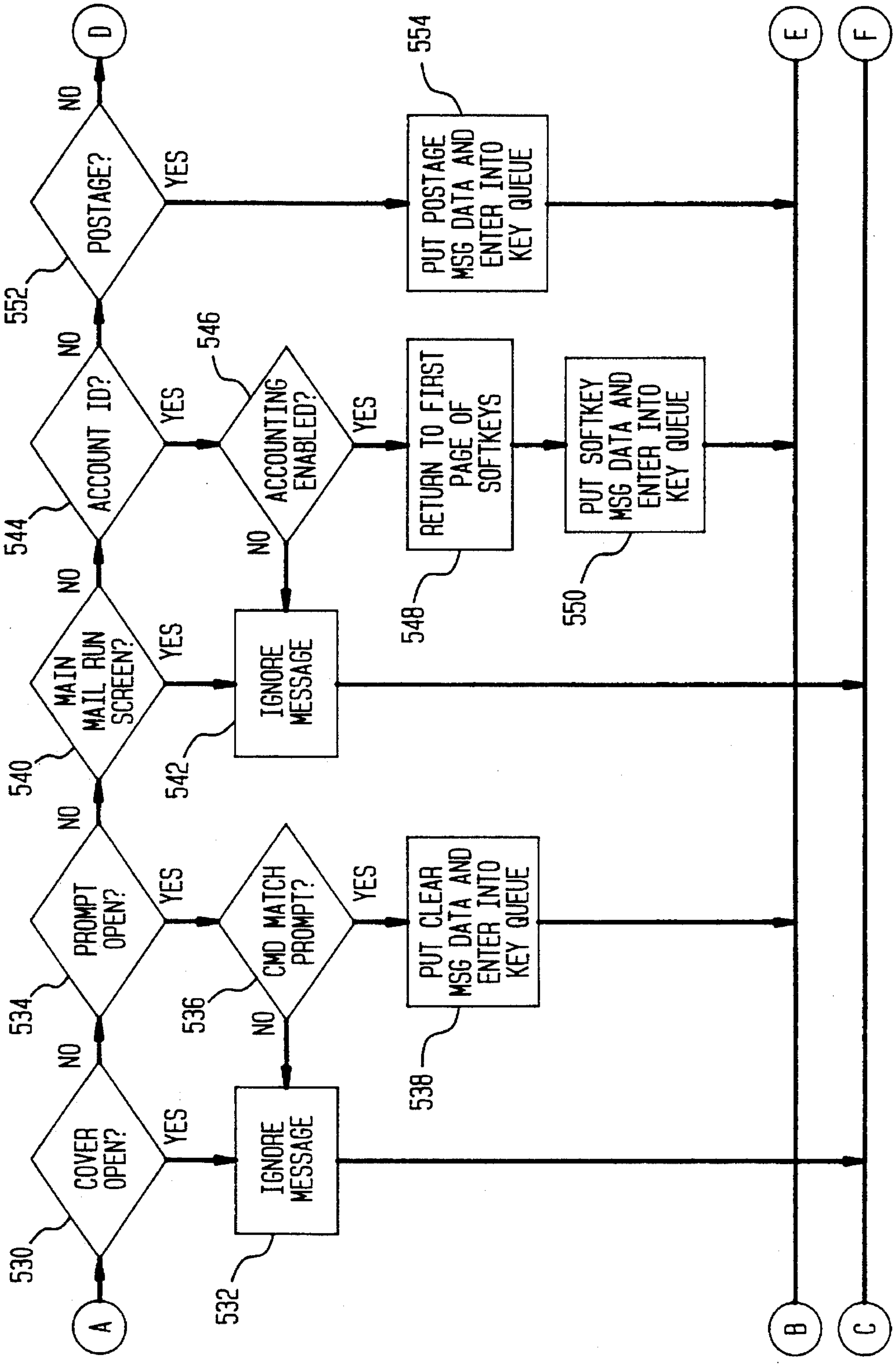
Figure 4C:
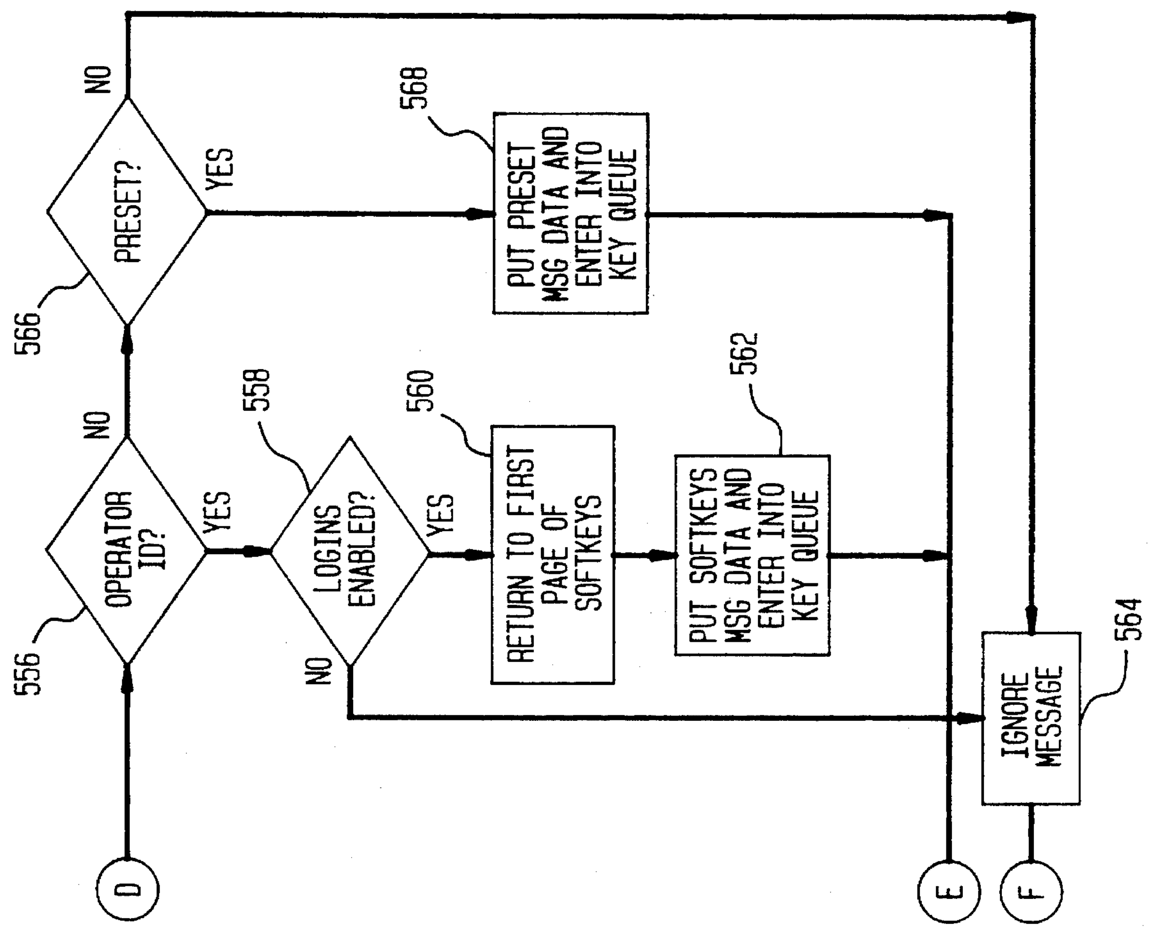

FIGS. 4*a* through 4*c* together comprise a flowchart of the routine for utilizing the barcode reader as input entry. At the start of the routine, it is assumed that the Barcode interface has been enabled to allow the reading of the code and that the wand has been wiped across the code to read in the conventional manner a desired code as illustrated in the charts described further below in connection with FIGS. 6*a* through 9. The available operations are detailed in U.S. patent application Ser. No. 629,796, previously mentioned and herewith specifically incorporated herein by reference. As seen in FIG. 4*a*, a check is first made at decision block 500 to see if there is a leading asterisk and if YES, at block 502 to see if there is a trailing asterisk. In the event that either one is not present, a "BAD BARCODE" message is displayed, block 504, and the Barcode interface is re-enabled at block 506.

If the asterisk checks are satisfactory, the mode is checked at block 508 and if the system is in the mail or tape mode the routine ignores the message, block 510, and re-enables the interface. Next the routine falls to decision block 512 where a check is made to determine whether the command is valid. If the answer is NO, the "BAD BARCODE" message is displayed, block 514, and the interface re-enabled.

If at decision block 512, the answer is YES the routine falls to decision block 516 to determine if it is a keycode command. If it is, the YES branch falls to decision block 518 to determine if the message length is valid. If NO, the interface is re-enabled. The YES branch at block 518 converts the message data into keycodes, block 520, and places the keycodes in a key queue, block 522. Thereafter, a beep is sounded, block 524, and the interface re-enabled.

When the answer at decision block 516 is NO, it is not a keycode command, the routine checks as to whether there is a machine mode command, decision block 524. If the answer is YES, the YES branch calls the Subroutine "Handle Machine Modes", block 526, discussed below with respect to FIG. 5, checks the outcome of the subroutine at decision block 528 and if successful, the YES branch beeps, block 524, and re-enables the interface. If NO, the interface is simply re-enabled.

In the event that the message is neither a keycode nor a machine mode command, the routine falls as seen now in FIG. **4*b* to decision block 530 to see if the cover is open, if YES, the message is ignored, block 532, and the interface re-enabled. If the cover is not open, then the NO branch goes to decision block 534 to check whether there is a prompt open. If there is, the command is checked, block 536, and if it matches the prompt, "CLEAR message data" and "ENTER" are put into the key queue, block 538**, the beep sounded and the interface re-enabled.

If there is no match, the message is ignored and the interface re-enabled. If there are no prompts open, a check is made, block 540 to see if the screen is the Main Mail Run screen. If it is, the message is ignored, block 542, and the interface re-enabled. If not the Main Mail Screen, the NO branch at block 540 goes to check whether the message is an Account Identification, decision block 544. If it is, then there is a check at block 546 to determine whether the accounting is enabled. If YES, there is a return to the first page of softkeys, block 548, the "message data" and "Enter" are put into the key queue, block 550, the beep is sounded and the interface re-enabled.

If the message is not an Account ID, then the NO branch of block 544 leads to decision block 552 where there is a determination of whether the message is postage. If YES, the branch falls to block 554 to put "POSTAGE", "message data", and "ENTER" into the key queue, sound the beep and re-enable the interface.

The NO branch of block 552 leads to a check as to whether the message is an Operator Identification message, decision block 556 of FIG. **4*c*. If YES, a check is made to see whether Log-ins are enabled, block 558, and if so the YES branch returns to first page of Softkeys, block 560, and at block 562, "SOFTKEYS", "message data", and "ENTER" are put into the key queue. Thereafter the beep is sounded and the interface re-enabled. If the Log-ins are not enabled when the check is made at block 558, the message is ignored, block 564**, and the interface re-enabled.

The NO branch from decision block 556 leads to decision block 566 where the message is checked to determine if it is a PRESET. If YES, "PRESET" "message data" and "ENTER" are put into the key queue, block 568, the beep sounded, and the interface re-enabled. If the answer is NO, the message is ignored, and the interface re-enabled.

Turning now to FIG. 5, the Subroutine Handle Machine Modes referred to in FIG. **4*a* will be described. When the routine 526 is called, a check is first made to see whether the screen will allow mimic keys, decision block 600. If YES, a check is made to see if the Key Queue is active, decision block 602. If YES, the length of the data message is checked to determine if it is OK, block 604, and thereafter a determination made of whether any mode commands are remaining, decision block 606, a NO result leads to a return with a success indication, block 608. The NO branch at any of the blocks 600, 602, or 604 leads to a return with a fail indication, block 610**.

When there are Mode commands, the YES branch of block 606 proceeds to extract the next mode command from the message, block 612, and then checks to see whether the command is valid, decision block 614. If NO the subroutine returns with a failed indication. If it is a valid command, the YES branch from block 614 proceeds to extract the value for the command, block 616,and changes the appropriate system setting accordingly. If the change is successful as tested at decision block 620, the YES branch proceeds to block 606 where the message is tested for more commands. If there is no success the subroutine returns with a failed indication.

It will now be apparent that the barcodes read from the barcode chart are converted into the same machine input commands and data input messages in the preferred embodiment illustrated herein as those which are utilized in the previously known interactive display and keyboard. While this requires the least software or firmware changes, it will be appreciated that the barcodes may be converted to other commands and appropriate information as desired.

FIGS. **6*a*–6*c*, 7, 8 and 9 illustrate a suitable barcode chart for use with the mail processing system previously described. The various segments shown may be maintained separately, but it is preferred that they all be printed on one chart which may be suitably detachably affixed to the machine, for instance at the top so that it is readily available to an operator for use with the wand 20**. It will also be understood however that the barcodes may be suitably provided as adjuncts, for example labels or cover sheets, to batches of mailpieces or even individual mailpieces in order to facilitate the entry of information in connection with the mailing.

FIG. **6*a* shows a representation of a postal indicia 1000 having blocks of barcodes grouped in association with the various elements making up the indicia. Thus with the Ad slogan block 1002 of the indicia there is an associated block 1004 labelled Ads which includes four barcodes shown at 1006, 1008, 1010, and 1012 respectively associated with the letters "A", "B", "C" and "D". The barcodes are used in in accordance with the invention to command the particular Ad slogan which will appear in the meter indicia printed by the mail processor's meter. Similarly, the barcodes grouped in the block 1014 labelled Inscriptions are associated with the Postal Inscription block 1016** of the representative indicia and may be read as previously described to command the respective inscription which is to appear in the meter indicia.

It will thus be understood that in the same manner, the date to be printed by the meter is commanded by the reading of the barcodes in the block 1018 labelled Date associated with the date circle 1020 of the representative indicia and the ON/OFF control of the date printer is read in conjunction with the barcodes in block 1022 labelled Date On/Off.

FIG. **6*b* shows a representation of the mail processor 1024 having associated therewith a plurality of blocks of barcodes representing the control options for the mailing operation. Feeder operation is changeable by reading the barcodes in block 1026 labelled Feeder. Thus reading of the barcode 1028 selects the auto feeder function while barcode 1030 selects single feed. The sealing operations are changeable by reading the barcodes in block 1032 labelled Sealer. Thus reading barcode 1034 selects Flaps Open/Sealed while reading barcode 1036 selects Flaps Open/Closed. Similarly barcode 1038** enables selection of Seal Only and barcode 1040 selects Seal Off. Scale operation of WOW On and WOW Off are selectable by reading barcodes 1042 and 1044 of the block 1046 labelled WOW. Tape operation is selectable by reading barcodes 1048, 1050, and 1052 to select Wet, Dry, or Adhesive, respectively, in the block 1054 which is labelled Tape. Stacker operation is controllable by reading Auto barcode 1056 or Constant barcode 1058 of block 1060 labelled Stacker.

Figure 6A:
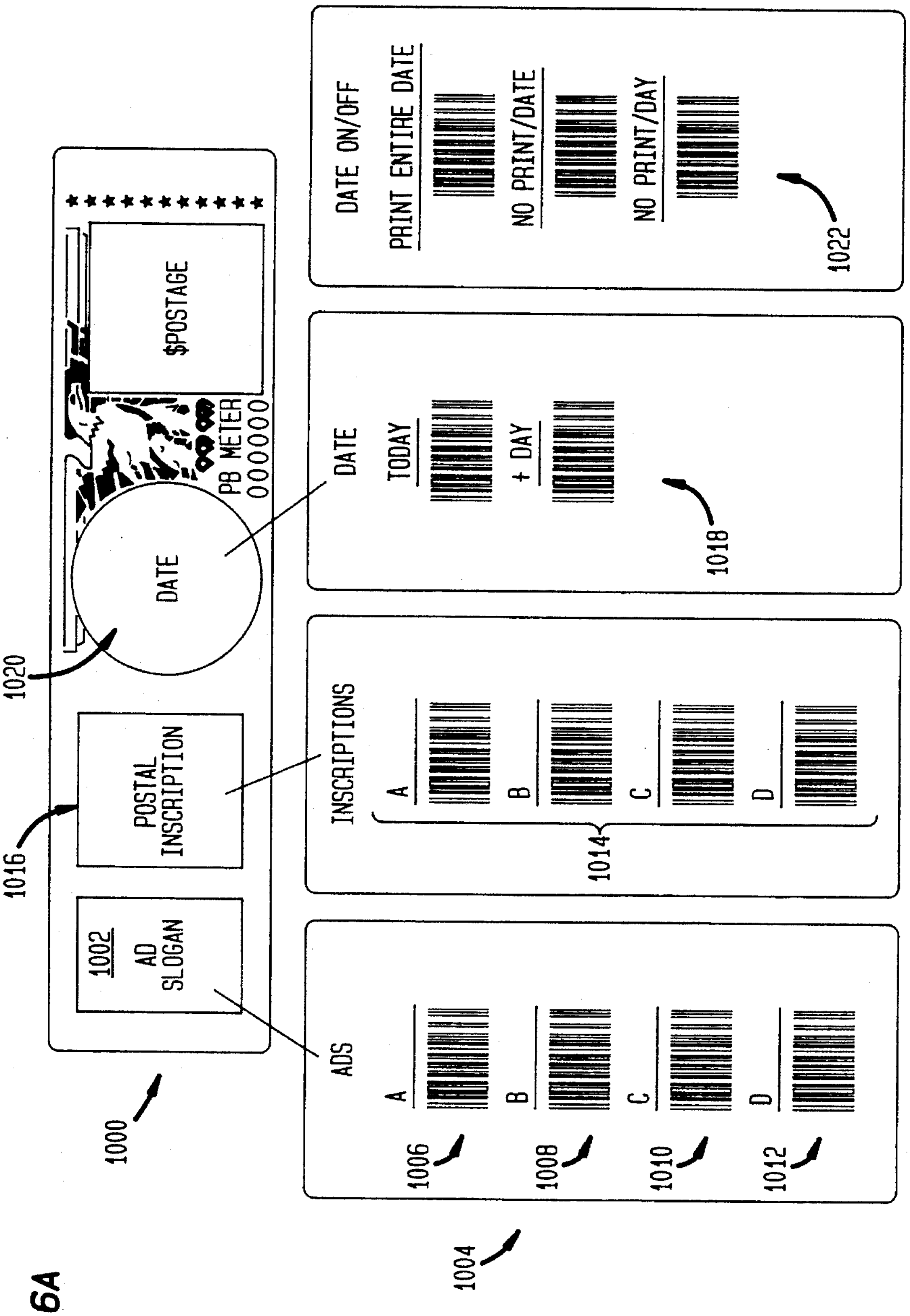
Figure 6B:
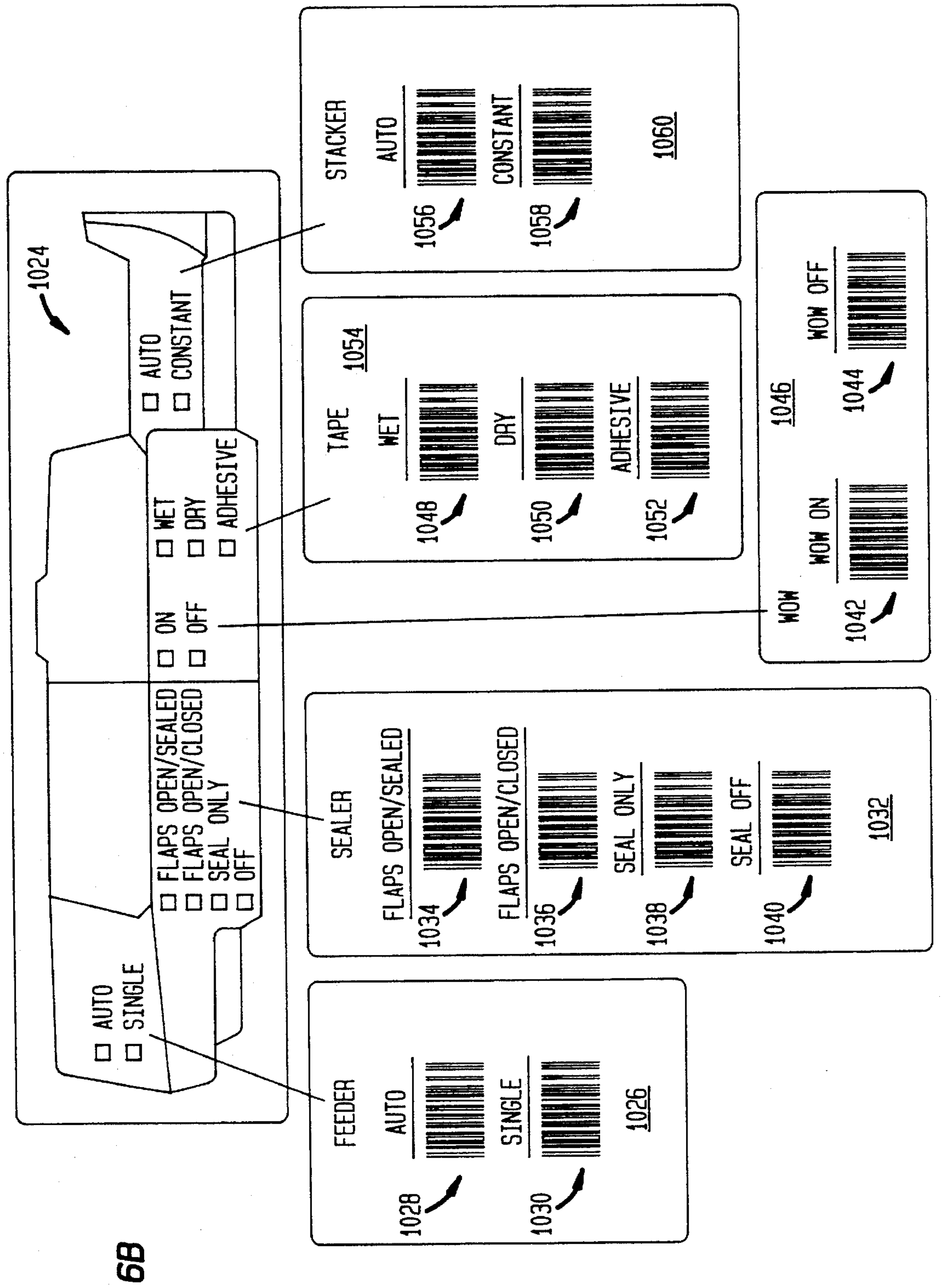
Figure 6C:
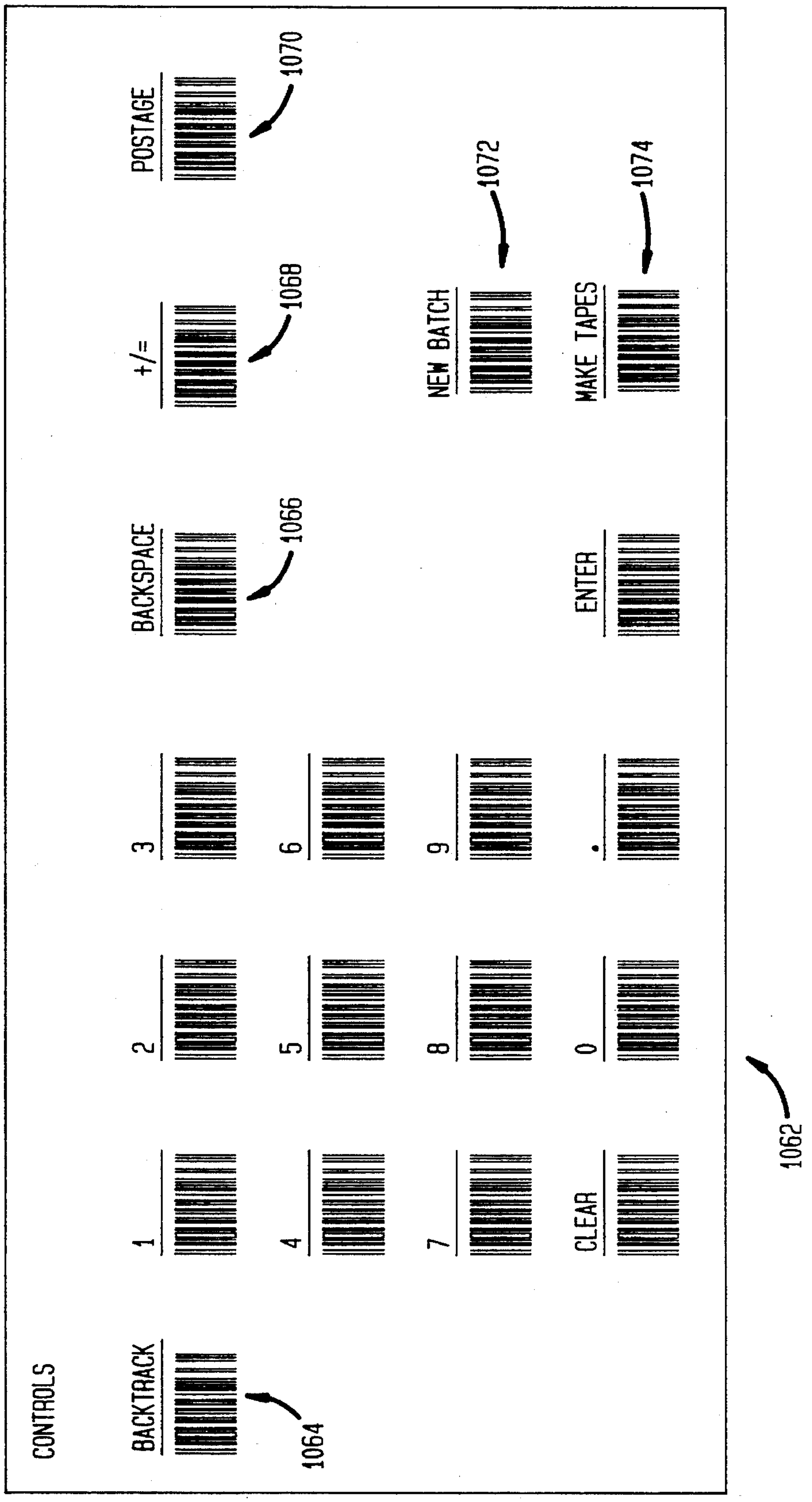

FIG. 6*c* shows further barcode inputs which include numerics as well as the Clear, decimal point, and ENTER functions indicated generally at 1062. Additional control functions such as barcode 1064 labelled Backtrack and barcode 1066 for Backspace. The chart may also include a ∓ function shown at 1068 and a Postage barcode 1070. Barcodes for New Batch function and Make Tapes control are shown at 1072 and 1074.

FIG. 7 illustrates a suitable Text Entry barcode chart having codes associated with a plurality of respective characters shown generally at 1076.

FIG. 8 shows suitable barcodes for entry of Job Preset information generally at 1078 while barcodes readable for entering particular account information are illustrated generally at 1080. In a preferred embodiment there are the nine Job Preset codes and ninety-nine account codes only twenty of which are illustrated in the Figure. The term Job Preset as used herein means a predetermined machine configuration of control settings and/or data inputs. It will be understood that the number of accounts and Preset Jobs is limited only by the desired capacity of the mail processor memory and not by a limitation on the codes available in accordance with the invention.

FIG. 9 is a chart illustrating the barcodes to be associated with the soft key functions. As seen in FIG. 9 the chart includes a plurality of barcodes shown generally at 1082 respectively associated with the soft keys 1084 on a representation of the display at 1084.

It will be appreciated that the codes illustrated are by way of example only and other suitable codes may be chosen as desired to represent the various functions and alphanumeric and character information. It will also be understood that the codes shown in connection with the chart affixed to the mail processor may also be used separately with, for example, mail to be processed.

An example of the utility of the barcode input device as described herein may be illustrated by assuming the operator receives a batch of mail having a label including a particular barcoded account number as well as, for example, the system Job Preset to be used in the mail run. In accordance with the invention, the account number and job preset are readable with the barcode wand and the system is thereby immediately setup for operation on the batch of mail with only simple wipes of the wand over the barcode information thus presented.

As mentioned previously, the operation of the system using the barcode wand and barcodes is particularly advantageous since there is no need for a large number of shifts of attention between the screen input and the barcode wand. It will also be apparent to those skilled in the art that there is no necessity in accordance with the present invention of moving through the screen menus of the system as described in the prior art.

What is claimed is:

1. In a mail processing machine having an interactive display, a microprocessor based control system, and input means including a barcode reader and an associated barcode chart, said barcode chart including barcodes respectively associated with alpha-numeric characters, said barcode chart including additional barcodes respectively associated with individual mail processing machine commands for controlling said mail processing machine, the improvement comprising:

said barcode chart including at least one preset barcode associated with a preset configuration of said mail processing machine, said preset barcode associated with a plurality of said mail processing machine commands, a separate barcode chart associated with a batch of mail and having said preset barcode thereon for providing job preset configuring information in respect of processing of said associated batch of mail, said barcode chart including additional barcodes respectively associated with selected accounts on said mail processing machine, said microprocessor based control system for converting said barcodes read by said barcode reader from said barcode chart into corresponding mail processing machine input information.

2. The mail processing machine of claim 1 wherein said microprocessor based control system further comprises:

a motor controller microprocessor, said programmable host controller microprocessor being further programmed to provide said input information to said motor controller microprocessor.

3. The mail processing machine of claim 2 wherein said microprocessor based control system further comprises:

a sensor controller microprocessor, said programmable host controller microprocessor being further programmed to provide said input information to said sensor controller microprocessor.

4. The mail processing machine of claim 3 wherein said microprocessor based control system further comprises:

a motor controller microprocessor, said programmable host controller microprocessor being further programmed to provide said input information to said motor controller microprocessor.

5. A method for controlling a mail processing machine having an interactive display, a microprocessor based control system, and input means including a barcode reader and an associated barcode chart, said barcode chart including barcodes respectively associated with alpha-numeric characters, said barcode chart including additional barcodes respectively associated with individual mail processing machine commands for controlling said mail processing machine, comprising the step(s) of:

(a) providing the barcode chart with at least one preset barcode associated with a preset configuration of said mail processing machine, said preset barcode associated with a plurality of said mail processing machine commands; and providing said barcode chart with additional barcodes respectively associated with selected accounts on said mail processing machine.

6. The method of claim 5, further comprising the step(s) of:

(c) providing a separate chart including said preset barcode wherein said separate chart is associated with a batch of mail; and (d) reading said preset barcode from said separate chart for providing job preset configuring information in respect of processing of said associated batch mail.

* * * * *